United States Patent
Sato (10) Patent No.: US 7,593,136 B2
(45) Date of Patent: Sep. 22, 2009

(54) DIGITAL IMAGE PROCESSING SYSTEM AND DIGITAL MAMMOGRAPHY SYSTEM

(75) Inventor: Chieko Sato, Hachioji (JP)

(73) Assignee: Konica Minolta Medical & Graphic, Inc. (JP)

(*) Notice: Subject to any disclaimer, the term of this patent is extended or adjusted under 35 U.S.C. 154(b) by 422 days.

(21) Appl. No.: 11/226,178

(22) Filed: Sep. 14, 2005

(65) Prior Publication Data
US 2006/0055978 A1   Mar. 16, 2006

(30) Foreign Application Priority Data
Sep. 15, 2004   (JP) ............................. 2004-268437

(51) Int. Cl.
*G06K 15/00* (2006.01)
*H04N 1/40* (2006.01)
*H04N 1/60* (2006.01)

(52) U.S. Cl. ...................... 358/3.23; 358/1.9

(58) Field of Classification Search .......... 358/1.9–3.32
See application file for complete search history.

(56) References Cited

U.S. PATENT DOCUMENTS

2001/0021269 A1*  9/2001  Inoue ................. 382/169
2001/0038707 A1*  11/2001  Ohara ................. 382/132

* cited by examiner

*Primary Examiner*—Douglas Q Tran
(74) *Attorney, Agent, or Firm*—Cantor Colburn LLP

(57) ABSTRACT

A digital image processing system includes: a memory for storing a gradation conversion table which correlates inputted image signals to output gradation values in the output device; and a gradation conversion unit for converting an inputted image signals that indicate the digital image, in accordance with the gradation conversion table, wherein the gradation conversion table is determined so that a gradient which represents change rate of gradation value between neighboring output gradation values, is kept the maximum over a predetermined range of the output gradation values.

10 Claims, 4 Drawing Sheets

FIG.5

# DIGITAL IMAGE PROCESSING SYSTEM AND DIGITAL MAMMOGRAPHY SYSTEM

BACKGROUND OF THE INVENTION

1. Field of the Invention

The present invention relates to a digital image processing system and a digital mammography system.

2. Description of the Related Art

As is well known, it has been performed to execute gradation processing of a digital radiation image, especially a digital X-ray image, according to a body part of a subject and/or a diagnostic purpose with a digital radiation image processing system.

The image which has received gradation processing is printed on a film to be output as a hard copy, or is output to an image display apparatus such as a CRT. Then, the output image is supplied to a reading (interpretation of image) by a doctor.

In case of a fluorescent intensifying screen-film system, a relation between an X-ray exposure amount and a developed density is always constant. However, in a digital radiation image processing system, an image reading apparatus converts an image signal to a digital signal within a range necessary as the image signal. Consequently, the digital radiation image processing system can control which density the digital signal is reproduced in. The control is called as gradation processing.

In the following, as an example, conventional normalization of a histogram and conventional gradation processing are described with reference to FIGS. 4 and 5.

First, representative values D1 and D2 are set from a cumulative histogram of image data in a region of interest (ROI). The representative values D1 and D2 are set as the levels of image data at which the cumulative histogram takes predetermined rates.

Figure 4:
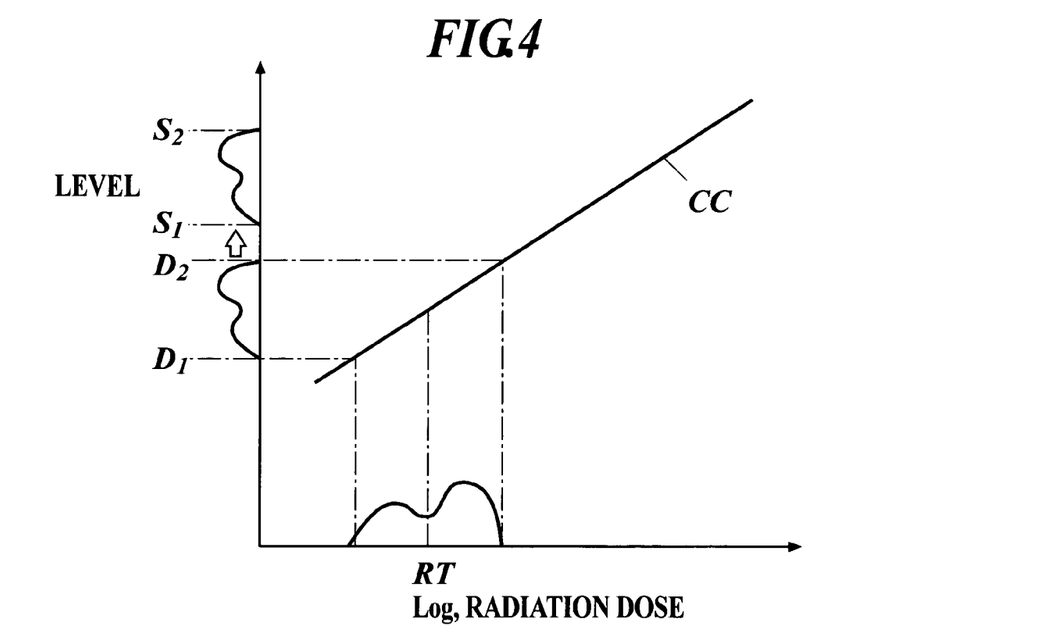
FIG. 4 is an explanatory diagram of a level conversion.
Figure 5:
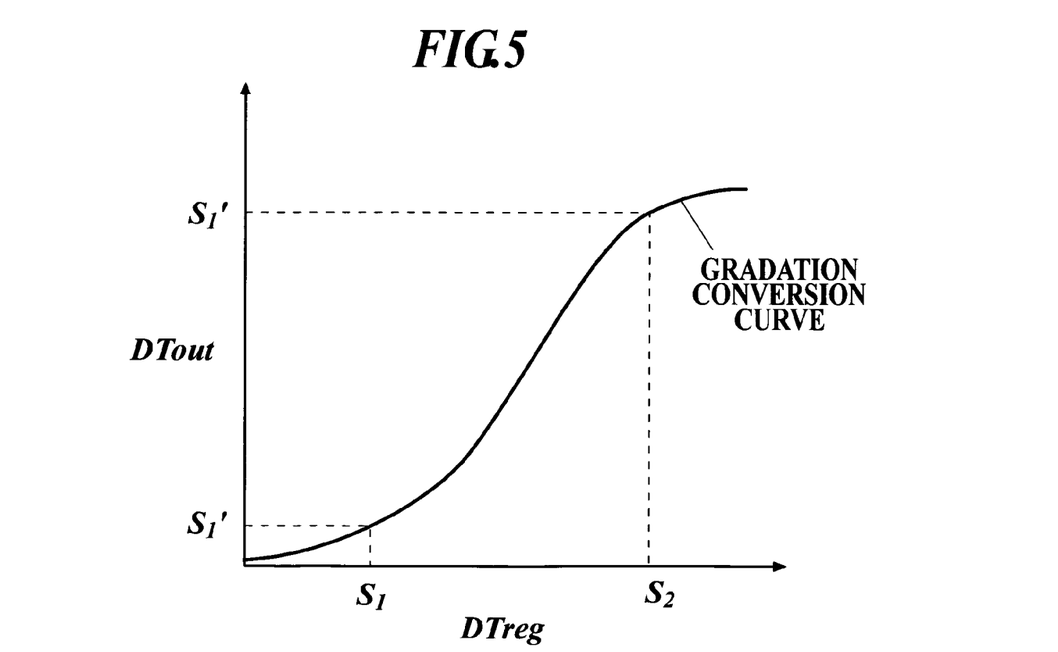
FIG. 5 is an explanatory diagram of a gradation conversion characteristic.

When the representative values D1 and D2, or the levels of image data at which the cumulative histogram takes predetermined rates m1 and m2, respectively, are set, normalization processing of performing the level conversion of the representative values D1 and D2 to desired levels S1 and S2, respectively, as shown in FIG. 4, is carried out by referring to a previously set. normalization processing look-up table. In FIG. 4, the ordinate axis indicates levels, and the abscissa axis indicates radiation doses. Hereupon, a characteristic curve CC shows the levels of the signals output according to the radiation doses of the radiations radiated to a radiation image conversion panel-through a subject.

Moreover, the normalization processing look-up table is generated by operations using the inverse function of a function indicating the characteristic curve CC of the radiation image conversion panel. Incidentally, the normalization processing may be performed by operation processing without using the normalization look-up table.

Next, gradation processing is performed using normalized image data DTreg obtained by the normalization processing. In the gradation processing, for example, a gradation conversion curve shown in FIG. 5 is used, and the normalized image data DTreg is converted into output image data DTout based on the levels S1' and S2' converted from reference values S1 and S2 of the normalized image data DTreg, respectively. The levels S1' and S2' severally correspond to predetermined luminance or density in an output image.

Generally, when a conversion of a digital signal based on a gradation conversion curve is performed, the conversion is adapted to previously store an output signal value corresponding to each input signal value as a series of data row (gradation conversion table), and to obtain an output signal value by referring to the data row whenever an input signal value is given.

Incidentally, because the shape of a preferable gradation conversion curve and the levels S1' and S2' differ according to a radiographing body part, a radiographing positioning, radiographing conditions, a radiographing method and the like, the gradation conversion curve may be produced to every image at each time.

Moreover, it is supposed that a plurality of basic gradation conversion curves are stored beforehand, and a desired gradation conversion curve can be easily obtained by reading any of the basic gradation conversion curves to perform a rotation and/or a parallel movement thereof.

As image processing, the output image data DTout which has received a desired gradation conversion can be obtained also by providing a gradation conversion table corresponding to a plurality of basic gradation curves, and by referring to the gradation conversion table based on the normalized image data DTreg while performing conversion to correct the obtained image data according to a rotation and/or a parallel movement of the basic gradation conversion curve.

The selection of a basic gradation curve, the rotation and/or the parallel movement of the basic gradation curve is performed based on the kind of the image display apparatus or the information pertaining to the kind of an external apparatus for outputting an image as the need arises. The reason is that a preferable gradation may differ dependently on the output system of the image.

As an example of the effects of the gradation processing, a contrast is improved in case of changing a gradation conversion curve to the one by which a difference of input image signals is changed to a larger density difference or a larger luminance difference in an output image.

As stated in JP-3260153B, it is performed to emphasize a region necessary to be improved in contrast according to a diagnosis purpose in a digital radiation image processing system. For example, in a chest X-ray image, the contrast of the region corresponding to a lung field is made to be the highest, and the contrast of the region of a mediastinum is suppressed not to skip to white. By such a way, reproduction is frequently performed so as to obtain a proper density over a wide range of an image signal. This is the gradation processing which can obtain almost the same gradation characteristic as that of the conventional fluorescent intensifying screen-film system or a little higher contrast of the region of a lung field.

Although the image having such a gradation characteristic is a mean one and is suitable for a standard diagnosis, there are demands of a diagnosis in a state of a still higher contrast in the lung field, a diagnosis in a state of a higher contrast in the mediastinum portion, and the like. In particular, in case of a group examination, a subject does not have symptoms of which the subject is conscious, and the existence or the kind of a change to a morbid state cannot be expected at all. The invention stated in JP-3260153B is constructed so as to switch LUT data in a gradation conversion unit while repeatedly transferring the LUT data to a display unit through the gradation conversion unit in the state of being synchronized with the display unit and the gradation conversion unit to make it possible to instantaneously obtain images which have received different kinds of gradation processing only by switching the LUT data in the gradation unit in order to perform a diagnosis using a plurality of images reproduced by the different kinds of gradation processing effectively.

However, even the prior art mentioned above still has the following problems.

Figure 2:
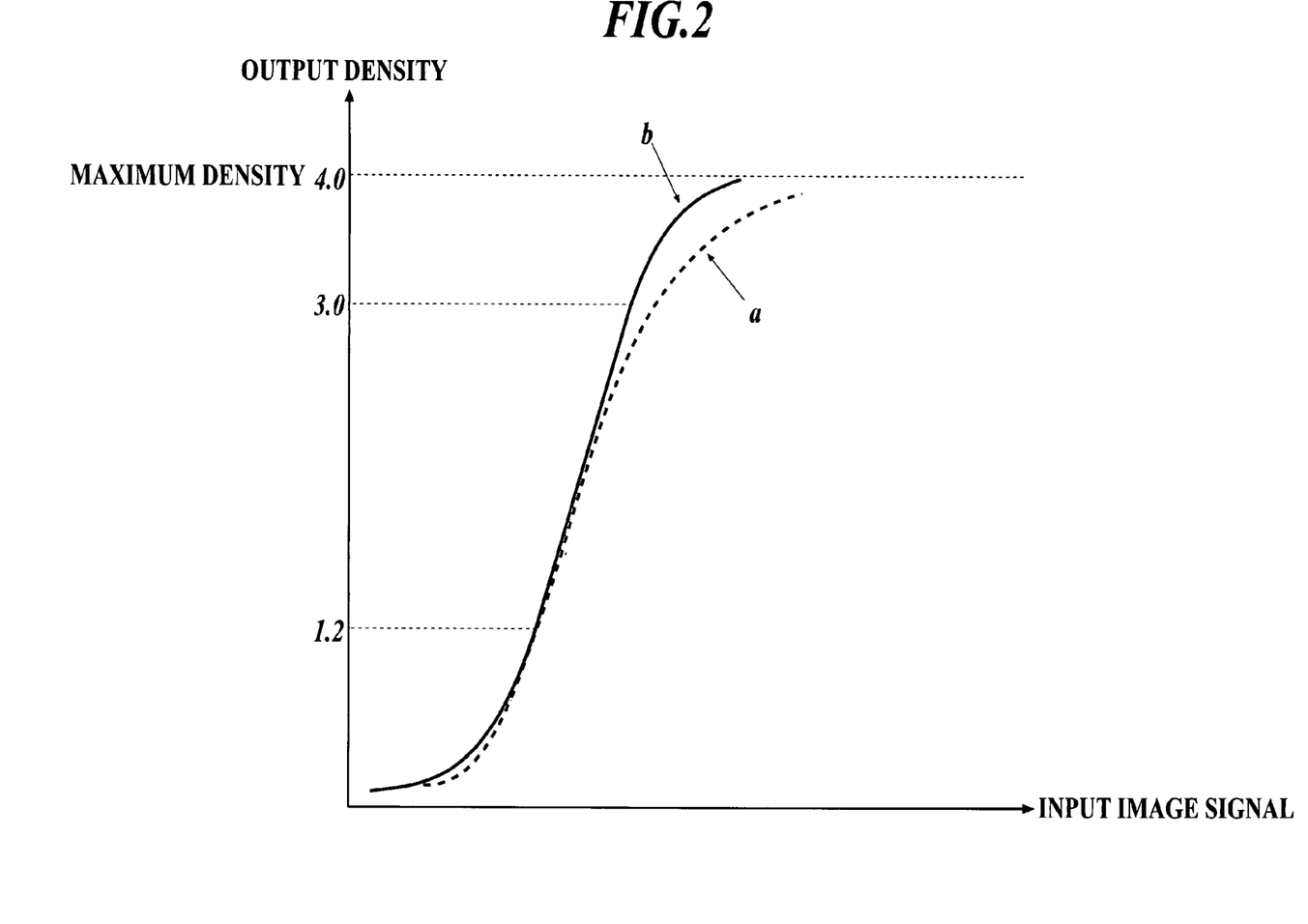
FIG. 2 shows a conventional gradation conversion curve "a" and a gradation conversion curve "b", which the present invention newly introduces.
Figure 3:
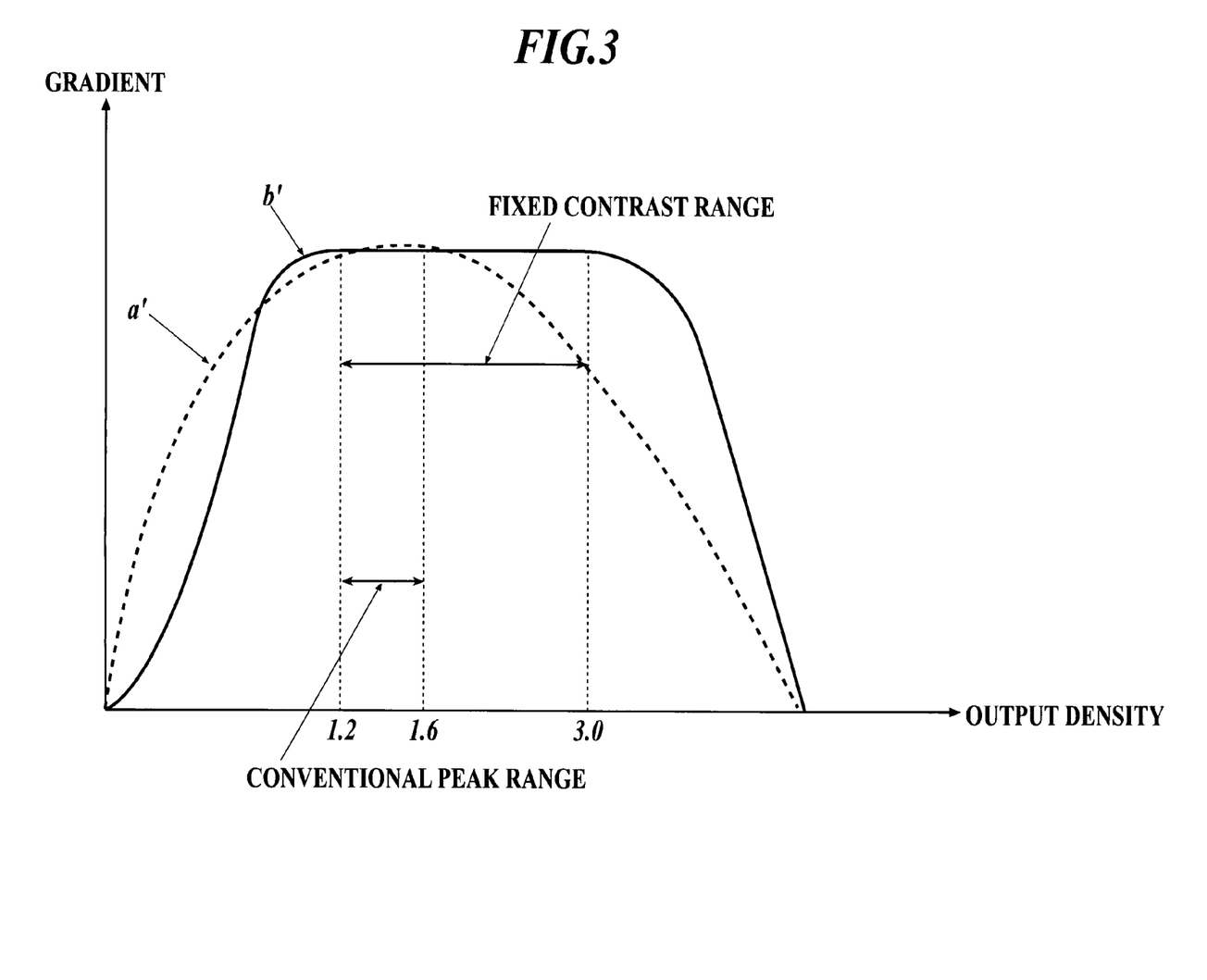
FIG. 3 shows a gradient curve "a'" of the gradation conversion curve "a", and a gradient curve "b'" of the gradation conversion curve "b"

A gradation conversion curve "a" corresponding to the gradation conversion table used in the conventional digital radiation image processing system is shown in FIG. 2. A gradient curve "a'" of the conventional conversion curve "a" is shown in FIG. 3.

As is well confirmed by the gradient curve "a'", the gradient of the conventional gradation conversion curve "a" changes from an increase to a decrease through the maximum point. The reason why the conventional gradation conversion curve "a" has such a characteristic is that the gradation conversion curve "a" follows the gradation characteristic of the conventional fluorescent intensifying screen-film system under the apprehension of a sense of incompatibility with a established diagnosing system using fluorescent intensifying screen-film system.

Because the contrast is improved as the gradient of the gradation conversion curve becomes larger, the conventional digital radiation image processing system sets the maximum point of the gradient of the gradation conversion curve "a" (=the maximum point of the gradient curve "a'") within a density range of a body part which is watched most strongly from the viewpoint of a diagnosis.

Consequently, the conventional gradation conversion curve "a" has a problem in which it becomes more difficult to perform a conversion in a good contrast over the whole of the body part in proportion as the density range of the body part becomes wider.

Moreover, the object body parts important from the viewpoint of a diagnosis are not always one in a medical image. In a medical image, the density ranges of a plurality of object body parts may differ from each other to be wide as a whole. Consequently, the conventional gradation conversion curve "a" has a problem in which it is difficult to perform conversions in all of the object body parts in good contrasts when a plurality of the objects body parts exist.

For example, in mammography, the gradation characteristic has been determined to make the contrast in the most important mammary gland from the viewpoint of a diagnosis best, although low density microcalcification, and a fat region and a pectoral region, which are high density regions, are also very important regions. Consequently, the contrasts of the microcalcification, the fat layer and the pectoral region may be lowered.

When the contrast of the whole is increased in vain in order to raise the contrast before and behind the highest point of the gradient of the conventional gradation conversion curve "a", the contrast may exceed the reproduction ability of a display device such as a CRT, or it may become necessary to especially prepare a Schaukasten (light box) of high luminance in a film reading system.

When a radiographed image is converted using different gradation conversion tables in order to output a plurality of images the gradations of which have been converted to be the optimum for each object body part, interpretation comparing each body part becomes troublesome. Although the technique stated in JP-3260153B can be used in case of outputting to an image monitor, the interpretation comparing each body part becomes especially troublesome in case of outputting to a film.

Even if a plurality of images which has received different kinds of gradation conversion processing is output, or even if an image each image region of which has received different kinds of gradation conversion processing is output, attention is needed when the comparing radiogram interpretation is performed to portions to which different gradation conversion characteristics have been applied, and a new radiogram interpretation standard taking the differences of the gradation conversion characteristics into account is required of a reading doctor. Consequently, it is apprehended that it becomes difficult for a radiogram interpretation doctor having deep experience in the fluorescent intensifying screen-film system radiograph to perform a diagnosis.

By the way, a mammography image has a narrow dynamic range, and in a low gradation expression, it is impossible to obtain a mammography image the diagnosis of which can be performed, and a radiogram interpretation of a comparatively minute change becomes necessary. Also in the mammography system, digitization has been progressing with a new technique such as a phase contrast radiographing technique in recent years. However, a display output to an image monitor, which has a less gradation number as compared with a film output, of the mammography image, which has a narrow dynamic range, is seldom used, and the film output is solely performed.

Accordingly, in a digital mammography system, it is desired that the film outputting of an image in which each diagnosis object body part is converted into a good contrast contributes to the state of a diagnosis being proper and expedient.

SUMMARY OF THE INVENTION

The present invention was made in consideration of the situation mentioned above. It is an object of the present invention to provide a digital radiation image processing system capable of giving a constant good contrast over an output range such as a density range and a luminance range which are important for a diagnosis.

To solve the above problem, in accordance with the first aspect of the present invention, a digital image processing system comprises:

a memory for storing a gradation conversion table which correlates inputted image signals to output gradation values in the output device; and a gradation conversion unit for converting an inputted image signals that indicate the digital image, in accordance with the gradation conversion table, wherein the gradation conversion table is determined so that a gradient which represents change rate of gradation value between neighbouring output gradation values, is kept the maximum over a predetermined range of the output gradation values.

In accordance with the second aspect of the invention, a digital mammography system comprises:

a memory for storing a gradation conversion table which correlates inputted image signals to output gradation values in the output device; and a gradation conversion unit for converting an inputted image signals that indicate the digital image, in accordance with the gradation conversion table, wherein the gradation conversion table is determined so that a gradient which represents change rate of gradation value between neighbouring output gradation values, is kept the maximum over a predetermined range of the output gradation values.

Hereupon, the "output value" is an output value of the image output apparatus, and output density and output luminance correspond to the output value. When the output parameter of the image output apparatus is density, the density corresponds to the "output value", and when the output parameter of the output apparatus is luminance, the luminance corresponds to the "output value". The "output value" may be evaluated by the light transmittance through a developed film on which a radiation image is formed. Moreover, the image output apparatus is an apparatus which outputs an image visibly, and the so-called image display apparatus and a printing apparatus correspond to the image output apparatus. The "output value" is not an output signal value transmitted invisibly like an electric signal and the like. A density value and a luminance value output by the image output apparatus visibly when an output image signal output by the gradation conversion unit is input into the image output apparatus correspond to the "output value."

Because the gradient of the graph of the change of the output value of the image output apparatus to the change of the input image signal is the maximum and constant in the predetermined range of the output value according to the first, the second, the third and the fourth aspect of the present invention, by superposing the predetermined range on a density range important from the viewpoint of a diagnosis, or the like, a constant and good contrast can be given to the density range important from the viewpoint of a diagnosis, or the like, and a sufficient gradation processing image capable of receiving a diagnosis can be obtained even if the gradation processing image exists only one. Thus, a diagnosis is rationalized, and the accommodation of the diagnosis is given.

According to the second aspect of the present invention, a mammography image output in a good constant contrast in not only the mammary gland but also a microcalcification, a fat layer and a pectoral region can be obtained. An image in which each diagnosis object site is converted to have a good contrast can be obtained. Even if the image is output to a film, it results in a proper diagnosis and being expedient.

Preferably, the gradation conversion table is determined so that a graph of gradient over the output gradation values changes in accordance with a smooth curve, and gradually increases as the output value becomes higher, and smoothly connects to a constant portion in the predetermined range, and changes in accordance with a smooth curve, and gradually decreases as the output value becomes higher than the predetermined range.

According to this invention, a progress rate of the contrast by a gradation conversion is kept to be the maximum and constant in the predetermined range, while an image in a range having a comparatively low importance from the viewpoint of a diagnosis around the predetermined range on the graph is covered by a comparatively low contrast conversion. Consequently, it is possible to output the whole image, without losing any part. Because the whole image is obtained, the state of the comparatively important portion, the image output of which is performed in the predetermined range, can be seen in the inside of the whole image, and no obstacles are constituted to a diagnosis.

Moreover, because the graph changes in accordance with a smooth curve the gradient of which gradually increases in proportion as the output value becomes higher to be smoothly continued to the straight line portion in the predetermined range, a curve portion in a low output value region and a transition from the low output value region to the predetermined range are smooth and natural. Similarly, because the graph changes in accordance with a smooth curve which is smoothly continued to the straight line portion in the predetermined region and has a gradation decreasing gradually in proportion as the output value becomes higher than the predetermined range, a transition from the predetermined range to a high output value region and a curve portion of the high output value region become smooth and natural, and no image quality deterioration owing to a rapid change of a contrast which hinders a diagnosis is made to be generated.

Incidentally, the smooth curve indicates a differentiable curve, and that "the curve portion is smoothly continued to the straight line portion" means that a tangential line of the curve portion converges to the same gradient as that of the straight line portion. Consequently, also at the connection points of the curve portions and the straight line portion, differentiation is possible.

BRIEF DESCRIPTION OF THE DRAWINGS

The present invention will be more completely understood with the detailed descriptions shown below and the attached drawings. However, these do not intend to limit the present invention, wherein.

DETAILED DESCRIPTION OF THE PREFERRED EMBODIMENTS

In the description in the embodiment of the present invention, the technical range of the present invention is not limited by the terms used in the present specification.

Figure 1:
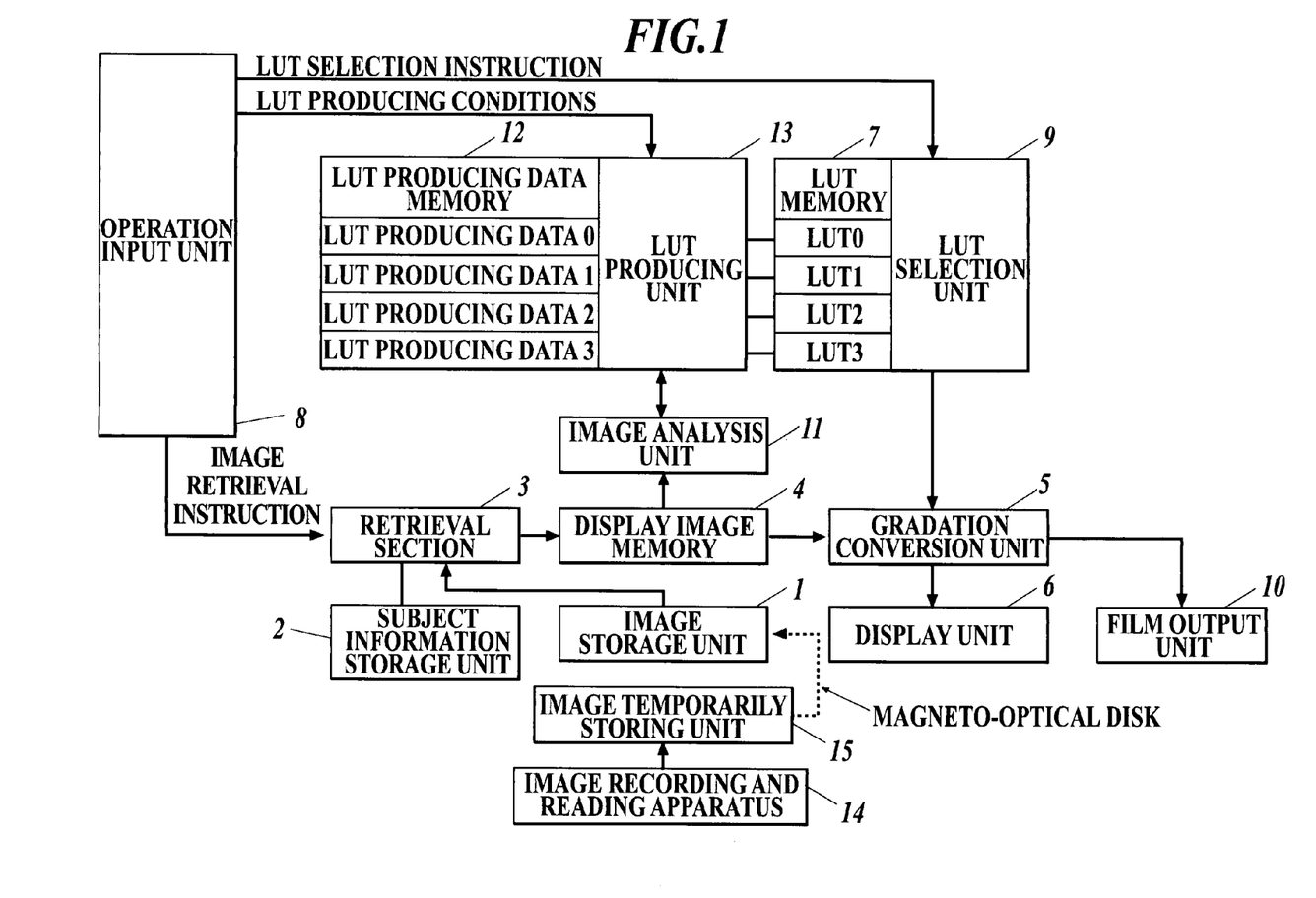
FIG. 1 is a block diagram of a digital mammography system.

FIG. 1 is a block diagram of a digital mammography system according to the present embodiment. A reference numeral 1 denotes an image storage unit. A reference numeral 2 denotes a subject information storage unit. A reference numeral 3 denotes a retrieval section. A reference numeral 4 denotes display image memory. A reference numeral 5 denotes a gradation conversion unit. A reference numeral 6 denotes a display unit. A reference numeral 7 denotes a LUT memory. A reference numeral 8 denotes an operation input unit. A reference numeral 9 denotes a LUT selection unit. A reference numeral 10 denotes a film output unit. A reference numeral 11 denotes an image analysis unit. A reference numeral 12 denotes a LUT producing data memory. A reference numeral 13 denotes a LUT producing unit. A reference numeral 14 denotes an image recording and reading apparatus. A reference numeral 15 denotes an image temporarily storing unit.

As the image storage unit 1, a magneto-optical disk library which can have a plurality of built-in magneto-optical disks is used. As the subject information storage unit 2 and the LUT producing data memory 12, a fixed magnetic disk is used. As the display image memory 4, the gradation conversion unit 5 and the display unit 6, a high accuracy CRT of the type of having the built-in display image memory and the built-in gradation conversion unit is used. As the retrieval section 3, the LUT memory 7, the LUT selection unit 9, the image analysis unit 11 and the LUT producing unit 13, a general purpose work station is used. For that purpose, a digital radiation image processing program is installed in the work station. As the image recording and reading apparatus 14, an apparatus which directly takes in a radiation image as a digital signal using a radiation image conversion panel having a stimulable phosphor layer is used. As the image temporarily storing unit 15, a magneto-optical disk is used. As the operation input unit 8, an input device such as a mouse and a keyboard is used.

Incidentally, a fixed magnetic disk, a magnetic tape or the like may be used in place of the magneto-optical disk.

As the image recording and reading apparatus 14, an apparatus using a flat panel detector (FPD), which can obtain an image signal of a radiation image without collecting transmitted light, reflected light or stimulable emission like in case of using a film digitizer and a stimulable phosphor detector. In case of using the FPD, a plurality of detection elements are two-dimensionally arranged to form an image pickup panel, and an image signal is formed based on the radiation dose detected by each detection element of the image pickup panel. Consequently, a radiation image having high sharpness can be obtained.

As a digital radiation image of the image storage unit 1, an image is obtained with the image recording and reading apparatus 14, which directly takes in a radiation image as a digital signal using the radiation image conversion panel having the stimulable phosphor layer. Then, the image is stored into a magneto-optical disk with the image temporarily storing unit 15 comprising a magneto-optical disk driver. Thus, the digital radiation image of the image storage unit 1 can be obtained by applying the magneto-optical disk to the image storage unit 1.

Many digitized medical radiation images are stored in the image storage unit 1. The many medical radiation images stored in the image storage unit 1 in the state of being associated with information such as image identification signs.

In case of a system using a radiation image conversion panel, the system does not need any troubles of developing a film, or reading with a scanner or the like. Consequently, such a system is advantageous at the time of treating a lot of images. Incidentally, a digital X-ray image may be obtained using X-ray CT and the like.

As the generating method of a radiation image, there are tomography (the X-ray CT is also a kind of the radiographing method), in which the positions of a radiation source, a subject and a detector (such as a stimulable phosphor panel) are changed while radiography is performed by radiating a plurality of times; plain radiography, in which radiography is performed by radiating only once in the state of fixing the positions of a subject and a radiation source; radiography using a contrast medium, which performs radiography by emphasizing a desired portion after mixing an X-ray absorbing material into a blood vessel or the like; enlargement radiography, which performs radiography in the state of putting a detector apart from a subject; and the like. Because an image obtained by using an ordinary film and an image obtained by using a stimulable phosphor are generally required to have a more delicate gradation property than an image obtained by using the X-ray CT, the improvement effect of diagnosis performance is remarkable in the present invention, which converts an image into the maximum and constant contrast in an important range. Among the images, a mammography image is especially has a narrow dynamic range and is required to have a delicate gradation property. According to the present invention, it is possible to diagnose the various portions of a medical radiation image with high reliability using a gradation processing image.

Subject information is stored in the subject information storage unit 2. As the subject information, individual information such as a name, a birth date, a sex, an address and a past diagnostic history; radiography information such as a radiography date of an image, a radiography place, radiation irradiating conditions and an image identification sign; and the like can be cited. The subject information storage unit 2 may be the same medium as the image storage unit 1, or may be separately provided. The retrieval section 3 retrieves the image identification sign of a target medical radiation image based on the retrieval condition comprising the subject information such as a radiography date, a radiography place and a past diagnosis history, which has been input together with a retrieval instruction through the operation input unit 8, and retrieves the image data stored in the image storage unit 1 in the state of being associated with the image identification sign based on the retrieved image identification sign to transfer the retrieved image data to the display image memory 4.

The display image memory 4 temporarily stores the medical radiation image transmitted from the image storage unit 1. The gradation conversion unit 5 performs a gradation conversion based on a LUT (gradation conversion table) to the medical radiation image transmitted from the display image memory 4, and it is preferable that the gradation conversion unit 5 has a function of temporarily storing the LUT data transmitted from the LUT selection unit 9. The display unit 6 displays the medical radiation image transmitted from the gradation conversion unit 5, and may comprise a liquid crystal display, a plasma display or the like in place of the CRT mentioned above. The image data stored in the display image memory 4 is repeatedly transferred to the display unit 6 through the gradation conversion unit 5 in the state of being always synchronized with the display unit 6 and the gradation conversion unit 5 by switching the LUT data of the gradation conversion unit 5. Consequently, images having received different kinds of gradation processing can be immediately obtained by only switching the LUT data of the gradation conversion unit 5, and is displayed on the display unit 6.

The LUT memory 7 stores a plurality of LUT's. LUT's 0 and 1 are designed for a digital mammography system.

The LUT 0 corresponds to the gradation conversion curve "a" shown in FIG. 2, and the LUT 1 corresponds to the gradation conversion curve "b" shown in FIG. 2. The gradient curve "a'" of the gradation conversion curve "a" and the gradient curve "b'" of the gradation conversion curve "b" are shown in FIG. 3.

The gradation conversion curve "a" has been conventionally used, and the gradient changes from increasing to decreasing through the maximum point, as it is well confirmed by the gradient curve "a'". The maximum point is set in a range of from about 1.2 to about 1.6 of the output density.

On the other hand, the gradation conversion curve "b" is newly introduced by the present invention. As is well confirmed by the gradient curve "b'", the gradient of the gradation conversion curve "b" increases until the output density of 1.2 and becomes the maximum and constant in a range of the output density of from 1.2 to 3.0 to change to decrease when the output density exceeds 3.0. The gradation conversion curve "b" forms a straight line portion in the range of the output density of from 1.2 to 3.0, and the curve portions on both the sides of the straight line portion and the connections of the straight line portion to the curve portions are formed to be smooth.

A digital mammogram image is required to have the output density having the maximum output density in a range of from 3.6 to 4.0. In the case where the maximum density is 4.0 as shown in FIG. 2, mammary gland density is required to be within a range of from about 1.2 to about 1.6. Accordingly, the maximum point of the gradient of the gradation conversion curve "a" is set within a range from 1.2 to 1.6 as mentioned above.

In the gradation conversion curve "a", it is undeniable that, when the mammary gland density is apart from the maximum point even in the range of the mammary gland density of from 1.2 to 1.6, the contrast lowers a little.

On the other hand, by the gradation conversion curve "b", i.e. by the LUT 1, the maximum and constant contrast can be given in the range of the mammary gland density of from 1.2 to 1.6.

There are important parts besides the mammary gland in a mammogram. They are microcalcification, a fat region and a pectoral region. When those parts are also included, the important parts appear in the range of the output density of from about 1.1 to about 3.5 in the case where the maximum density is 4.0.

In case of the gradation conversion curve "a", i.e. in case of the LUT 0, the contrast lowers in the range of the output density of from 1.6 to 3.0. The gradation processing in which the maximum point of the gradient is set within a range of the output density of from 1.6 to 3.0 becomes necessary to be executed separately.

On the other hand, by the gradation conversion curve "b", i.e. by the LUT 1, the maximum and constant contrast can be obtained also in the range of the output density of from 1.6 to 3.0 similarly to the range of the mammary gland density of from 1.2 to 1.6.

In case of the gradation conversion curve "a", i.e. in case of the LUT 0, the lowering of the contrast becomes remarkable in a range of the output density of from 3.0 to 3.5.

On the other hand, in case of the gradation conversion curve "b", i.e. in case of the LUT 1, a comparatively high contrast is given, although the contrast in not the maximum, in the range of the output density of from 3.0 to 3.5.

In case of the gradation conversion curve "a", i.e. in case of the LUT 0, the contrast lowers in the range of the output density of from 1.1 to 1.2.

On the other hand, in case of the gradation conversion curve "b", i.e. in case of the LUT 1, a high contrast which is almost the same as the maximum, although the contrast is not the maximum, is given in a range of the output density of from 1.1 to 1.2.

It is possible to select one of the LUT's 0-3 as the gradation conversion table to be used in the gradation conversion unit 5 by inputting a LUT selection instruction into the LUT selection unit 9 by operating the operation input unit 8.

By selecting the LUT 1, the range of the output density of from about 1.1 to about 3.5, which is important from the viewpoint of a diagnosis, can be converted to a high contrast, and the whole image can be obtained in a natural contrast transition.

The mammogram image having received the gradation conversion is displayed on the display unit 6, and is output to be recorded on a film in the film output unit 10 by an instruction from the operation input unit 8. Because a good contrast is realized in each diagnosis object body part by obtaining one output image for one radiographing image when the LUT 1 is selected, a sufficient diagnosis can be performed.

The production of a LUT is performed as follows, for example. It is supposed that a LUT used as a basis of the production of a new LUT is one which has been selected by the LUT selection unit 9. Here, a description is given to the case of using the LUT 1 as a basis. The LUT producing data 0-3 is LUT conversion programs. The LUT producing data 0 is the rotation of the whole; the LUT producing data 1 concerns the parallel displacement of the whole; the LUT producing data 2 concerns the movement of a specific point; and the LUT producing data 3 concerns dynamic range adaptation.

First, a LUT selection instruction is input from the operation input unit 8, and the LUT 1 is selected in the LUT selection unit 9. In conjunction with the selection, the LUT 1 is applied to the display unit 6, and an image which has received the gradation conversion is displayed.

On the other hand, the gradation conversion curve "b" of FIG. 2, a conversion menu, a preview button and a preservation button are displayed on the monitor for operation, which is not illustrated.

When an operator selects the rotation of the whole from the conversion menu through the operation input unit 8, the whole can be rotated by operating the mouse included in the operation input unit 8 (such as dragging on the locus of the rotation). Moreover, it is possible to perform the numerical input of a rotation angle with a keyboard to perform the rotation. In that case, the center of the rotation is set at the center of graph in a first stage, and is specified arbitrarily with a mouse in a second stage.

When the operator selects the parallel displacement of the whole from the conversion menu through the operation input unit 8, the parallel displacement of the whole can be performed by operating the mouse included in the operation input unit 8 (such as clicking a point after the movement, or dragging on the locus of the movement).

Moreover, the parallel displacement is performed by performing the numerical input of the amount of the movement in each axial direction with the keyboard.

When the operator selects the movement of a specific point from a conversion menu through the operation input unit 8, the start point and the end point of the gradation conversion curve "b", and the start point and the end point of the straight line portion of the gradation conversion curve "b" are highlighted. Those points are dragged with the mouse included in the operation input unit 8 to be moved in arbitrary directions. Alternatively, the numeric input of the movement amount of each axial direction is performed about each point with the keyboard to perform the movements. After the movements of the points, the gradation conversion curve "b" is redrawn.

For example, by moving the start point (the point corresponding to the output density of 1.2 in FIG. 2) of the straight line portion of the gradation conversion curve "b" into the negative direction of the input image signal axis, the input image signal range of the straight line portion can be enlarged without changing the output density range of the straight line portion. As a result, the gradient of the straight line portion reduces.

By moving the end point (the point corresponding to the output density of 3.0 in FIG. 2) of the straight line portion of the gradation conversion curve "b" into the positive direction of the input image signal axis, the input image signal range of the straight line portion can be enlarged without changing the output density range of the straight line portion. As a result, the gradient of the straight line portion reduces.

By moving the start point of the straight line portion of the gradation conversion curve "b" into the negative direction of the output density axis, the output density range of the straight line portion can be enlarged without changing the input image signal range of the straight line portion. As a result, the gradient of the straight line portion enlarges.

By moving the end point of the straight line portion of the gradation conversion curve "b" into the positive direction of the output density axis, the output density range of the straight line portion can be enlarged without changing the input image signal range of a straight line portion. As a result, the gradient of the straight line portion enlarges.

By moving the start point, the end point or both of the points of the straight line portion of the gradation conversion curve "b" along the straight line portion, the straight line portion can be extended or shortened without changing the gradient of the straight line portion.

In addition, by moving the start point and the end point of the gradation conversion curve "b", and the start point and the end point of the straight line portion of the gradation conversion curve "b" freely in the vertical, the horizontal and oblique directions, various new gradation conversion curves can be produced. It is better to enlarge the gradient of the straight line portion of an image having a narrow dynamic range, and to reduce the gradient of the straight line portion of an image having a large dynamic range.

When the operator selects the dynamic range adaptation from the conversion menu through the operation input unit 8, the LUT producing unit 13 instructs the image analysis unit 11 to analyze the dynamic range of the image read out in the display image memory.

The LUT producing unit 13 receives the dynamic range which the image analysis unit 11 has analyzed, and moves the start point and the end point of the straight line portion of the gradation conversion curve "b" to make the range of the straight line portion agree with the 100% of the dynamic range or a previously set percentage of about 99-60% of the dynamic range, which is the core portion of the dynamic range. Furthermore, the LUT producing unit 13 produces a corresponding gradation conversion table. The produced gradation conversion table is given to the gradation conversion unit 5 through the LUT memory 7 and the LUT selection unit 9. The gradation conversion unit 5 performs the gradation conversion of the image read into the display image memory 4 by the gradation conversion table given from the LUT selection unit 9, and the image having received the gradation conversion of the gradation conversion unit 5 is displayed on the display unit 6.

When the operator clicks the preview button, a gradation conversion table is produced correspondingly to the gradation conversion curve, and the produced gradation conversion table is given to the gradation conversion unit 5 through the LUT memory 7 and the LUT selection unit 9. The gradation conversion unit 5 performs the gradation conversion of the image read to the display image memory 4 by the gradation conversion table given from the LUT selection unit 9, and the image the gradation conversion of which is performed by the gradation conversion unit 5 is displayed on the display unit 6.

When the operator clicks the preservation button, a gradation conversion table is produced correspondingly to the gradation conversion curve, and the produced gradation conversion table is preserved in the LUT memory 7, for example, as the LUT 2. The preserved gradation conversion table can be selected at any time unless the gradation conversion table is deleted.

In a mammography system, because the radiation image output to the film is made to be the final object of radiogram interpretation diagnosis in many cases, it is important to design the gradation conversion table according to the characteristic of the image output apparatus used in the film output unit 10.

It is also important to design the gradation conversion table according to the characteristic of the image display apparatus used in the display unit 6. The design becomes important as a preview even in a medical image system like a mammography system which uses the radiation image output to a film as the final object for a radiogram interpretation diagnosis, and the design becomes still more important in a field in which radiogram interpretation diagnosis is wholly preformed on the display unit 6.

It is important to adapt the gradation conversion table to both of the film output unit 10 and the display unit 6, and it is important to make the reproducibility of the film output unit 10 and the display unit 6 agree with each other as much as possible. When a gradation conversion table which can be adapted to both of the film output unit 10 and the display unit 6 cannot be designed, the gradation conversion tables which are severally adapted to the film output unit 10 and the display unit 6 are provided separately. That is, the gradation conversion table for a display and the gradation conversion table for a film output are severally provided as the LUT's 0-3. When the gradation characteristics of the image output apparatus are different from each other, it is preferable to provide the gradation conversion table corresponding to each apparatus.

All the disclosed contents of Japanese Patent Application No. 2004-268437 filed Sep. 15, 2004 are incorporated into the present application by reference.

What is claimed is:

1. A digital image processing system, comprising:
   a memory for storing a gradation conversion table which correlates inputted image signals to output gradation values to an output device; and
   a gradation conversion unit for converting the inputted image signals that indicate a digital image, in accordance with the gradation conversion table,
   wherein the gradation conversion table is determined so that a gradient which represents change rate of neighboring output gradation values, is kept to be maximum and constant over a ranges of the output gradation values corresponding to a plurality of diagnosis object body parts.

2. The system of claim 1, wherein the gradation conversion table is determined so that a graph of the gradient over the output gradation values changes in accordance with a smooth curve, and gradually increases as the output gradation value becomes higher, and smoothly connects to the maximum and constant portion in the ranges, and changes in accordance with a smooth curve, and gradually decreases as the output gradation value becomes higher than the ranges.

3. The system of claim 1, further comprising a selection unit for selecting a gradation conversion table to be applied to the gradation conversion unit among a plurality of gradation conversion tables stored in the memory.

4. The system of claim 1, further comprising a display unit for displaying a digital radiation image converted by the gradation conversion unit.

5. A digital mammography system, comprising:
   a memory for storing a gradation conversion table which correlates inputted image signals to output gradation values to an output device; and
   a gradation conversion unit for converting the inputted image signals that indicate a digital image, in accordance with the gradation conversion table,
   wherein the gradation conversion table is determined so that a gradient which represents change rate of neighboring output gradation values, is kept to be maximum and constant over a ranges of the output gradation values corresponding to a plurality of diagnosis object body parts.

6. The system of claim 5, wherein the gradation conversion table is determined so that a graph of gradient over the output gradation values changes in accordance with a smooth curve, and gradually increases as the output gradation value becomes higher, and smoothly connects to the maximum and constant portion in the ranges, and changes in accordance with a smooth curve, and gradually decreases as the output gradation value becomes higher than the ranges.

7. The system of claim 5, further comprising a selection unit for selecting a gradation conversion table to be applied to the gradation conversion unit among a plurality of gradation conversion tables stored in the memory.

8. The system of claim 5, further comprising a display unit for displaying a digital radiation image converted by the gradation conversion unit.

9. The digital image processing system of claim 1, wherein the graduation conversion table is determined so that a gradient is kept to be maximum and constant over a range of from 1.2 to 3.0 of the output gradation values, when the maximum value of the output gradation values is from 3.6 to 4.0 and the range of the output gradation values of the diagnosis object body part is from 1.2 to 1.6.

10. The digital mammography system of claim 5, wherein the gradation conversion table is determined so that a gradient is kept to be maximum and constant over a range of from 1.2 to 3.0 of the output gradation values, when the maximum value of the output gradation values is from 3.6 to 4.0 and the range of the output gradation values of mammary gland density is from 1.2 to 1.6.

* * * * *